United States Patent
Imura

(10) Patent No.: US 7,828,103 B2
(45) Date of Patent: Nov. 9, 2010

(54) VEHICLE

(75) Inventor: Yousuke Imura, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 252 days.

(21) Appl. No.: 12/047,171

(22) Filed: Mar. 12, 2008

(65) Prior Publication Data

US 2008/0223647 A1 Sep. 18, 2008

(30) Foreign Application Priority Data

Mar. 13, 2007 (JP) ............... 2007-062772

(51) Int. Cl.
*B62K 11/04* (2006.01)

(52) U.S. Cl. .............. 180/219

(58) Field of Classification Search .......... 180/219
See application file for complete search history.

(56) References Cited

U.S. PATENT DOCUMENTS

| | | | | |
|---|---|---|---|---|
| 4,727,953 A * | 3/1988 | Kudo et al. | ........ | 180/219 |
| 5,020,625 A * | 6/1991 | Yamauchi et al. | ........ | 180/219 |
| 5,211,256 A * | 5/1993 | Muramatsu | ........ | 180/219 |
| 6,371,236 B1 * | 4/2002 | Fukunaga | ........ | 180/219 |
| 6,497,300 B2 * | 12/2002 | Mori et al. | ........ | 180/219 |
| 6,640,921 B2 * | 11/2003 | Okuma | ........ | 180/219 |
| 6,932,177 B2 * | 8/2005 | Hara et al. | ........ | 180/219 |
| 7,114,588 B2 * | 10/2006 | Kudo et al. | ........ | 180/219 |
| 7,422,243 B2 * | 9/2008 | Kudo et al. | ........ | 280/834 |
| 7,637,345 B2 * | 12/2009 | Kurokawa et al. | ........ | 180/311 |
| 7,644,800 B2 * | 1/2010 | Adachi et al. | ........ | 180/309 |
| 2001/0045312 A1 * | 11/2001 | Adachi et al. | ........ | 180/219 |
| 2002/0088658 A1 * | 7/2002 | Ito | ........ | 180/219 |
| 2003/0079926 A1 * | 5/2003 | Taniguchi et al. | ........ | 180/219 |
| 2004/0200652 A1 * | 10/2004 | Hara et al. | ........ | 180/219 |
| 2006/0076175 A1 * | 4/2006 | Yamakura et al. | ........ | 180/219 |
| 2006/0169511 A1 * | 8/2006 | Kurokawa et al. | ........ | 180/219 |
| 2006/0283648 A1 * | 12/2006 | Nishiura | ........ | 180/219 |
| 2007/0193805 A1 * | 8/2007 | Adachi et al. | ........ | 180/219 |
| 2008/0121453 A1 * | 5/2008 | Koike | ........ | 180/219 |

FOREIGN PATENT DOCUMENTS

JP 04-008686 1/1992

* cited by examiner

*Primary Examiner*—Lesley Morris
*Assistant Examiner*—Michael R Stabley
(74) *Attorney, Agent, or Firm*—Rabin & Berdo, PC

(57) ABSTRACT

A motorcycle has an engine, a main frame passing above the engine and extending rearward, and a down tube passing below the engine and extending rearward. An upper part of the engine is overlapped with the main frame without projecting above the main frame, and a lower part of the engine is overlapped with the down tube.

11 Claims, 9 Drawing Sheets

//VEHICLE

RELATED APPLICATIONS

This application claims the benefit of priority under 35 USC 119 of Japanese patent application no. 2007-062772, filed on Mar. 13, 2007, which application is hereby incorporated by reference in its entirety.

BACKGROUND OF THE INVENTION

1. Field of the Invention

This invention relates to a vehicle having an engine and frames.

2. Description of Related Art

A vehicle having an engine and frames is known. JP-B-2887874, for example, discloses a motorcycle having an engine, a main frame passing above the engine and extending rearward, and a down tube passing below the engine and extending rearward. An upper part of the engine projects above the main frame and a lower part of the engine projects below the down tube, when viewed from the side.

In JP-B-2887874, however, members such as a fuel tank and a seat that are disposed over the engine and main frame must be formed not to abut against the part of the engine projecting above the main frame. For this reason, it is difficult to dispose members such as the fuel tank and seat above the engine and main frame.

SUMMARY OF THE INVENTION

This invention solves this problem and provides a vehicle in which members are disposed above the engine and frames with reduced difficulty.

A vehicle according to one aspect of the invention has an engine, a first frame passing above the engine and extending rearward, and a second frame passing below the engine and extending rearward. An upper part of the engine is overlapped with the first frame without projecting above the upper end of the first frame, and a lower part of the engine is overlapped with the second frame.

In this vehicle, since the upper part of the engine is not projected above the upper end of the first frame, there is no need to form members such as a fuel tank and a seat that are disposed over the engine and the first frame in a manner not to abut on a part of the engine projecting above the first frame. Thus, the difficulty of disposing members such as the fuel tank and seat over the engine and the first frame is reduced. Also, the need for the first frame to take a higher position is curtailed. Thus, the need for members such as the fuel tank and seat to take a higher position is also restricted. In addition, because the lower part of the engine is overlapped with the second frame, the need for the second frame to take a lower position is less than in a case in which the second frame is disposed below the engine to avoid overlapping a lower part of the engine. Thus, interference of the second frame with uneven ground or the like is restricted.

In one embodiment, the upper part of the engine includes a cylinder head cover part overlapped with the first frame without projecting above the first frame. Projection of the cylinder head cover part above the first frame is thereby restricted.

In one embodiment, the lower part of the engine is overlapped with the second frame without projecting below the second frame. Projection of the lower part of the engine below the second frame is thereby restricted, and interference of the lower part of the engine with uneven ground or the like is restricted by the second frame.

In one embodiment, the engine includes an oil pan in a lower part of a crankcase part. The oil pan is overlapped with the second frame without projecting below the lower end of the second frame, such that interference of the oil pan with uneven ground or the like is restricted.

In one embodiment, a rear part of the first frame is joined to and rotatable around a rear-part-connecting-part on the second frame. The engine can thereby be fixed to the second frame while setting the first frame and the second frame in an open position by rotating the first frame around the rear-part-connecting-part on the second frame. After the engine is fixed to the second frame, the first frame and the second frame are closed by rotating the first frame around the rear-part-connecting-part on the second frame. Thus, the engine, with its upper part overlapped with the first frame and its lower part overlapped with the second frame, is easily disposed in a position below the first frame and above the second frame.

In one embodiment, the front part of the first frame and the front part of the second frame are fastened by screw members such that the first and second frames are set in a closed position by rotating the first frame around the rear-part-connecting-part on the second frame.

In one embodiment, the first frame is made of aluminum and the second frame is made of iron. Thus, even though the first and second frames are made of different materials, they are easily fastened by the screw members.

In one embodiment, the first frame includes a first fixing part provided for fixing the engine, and the second frame includes a second fixing part provided for fixing the engine. The engine is disposed so that its upper part is overlapped with the first frame except for the first fixing part, and its lower part is overlapped with the second frame except for the second fixing part. With this structure, the possibility for the first frame to take a higher position and the second frame to take a lower position is further restricted.

In one embodiment, the first frame includes a first cylindrical part and the second frame includes a second cylindrical part. The engine is disposed so that its upper part is overlapped with the first cylindrical part of the first frame, and its lower part is overlapped with the second cylindrical part of the second frame. With this structure, the upper and lower parts of the engine are protected by robust cylindrical parts of the first and second frames.

In one embodiment, a fuel tank is disposed above the engine and the first frame includes rearwardly extending left and right side frame parts. At least part of the fuel tank is disposed in an area between the left and right side frame parts. The fuel tank can thus have a larger capacity when disposed above the engine and the first frame, since at least part of the fuel tank is disposed in the area between the left and right side frame parts.

In one embodiment, a head pipe part is disposed in front of the engine. The first frame includes a main frame joined to the head pipe part, and the second frame includes a down tube joined to the front part of the main frame. The possibility of the main frame taking a higher position and the down tube taking a lower position is thereby further restricted.

Other features and advantages of the invention will be apparent from the following detailed description, taken in conjunction with the accompanying drawings that illustrate, by way of example, various features of embodiments of the invention.

DETAILED DESCRIPTION OF THE INVENTION

An embodiment of the invention is now described with reference to the drawings.

Figure 1:
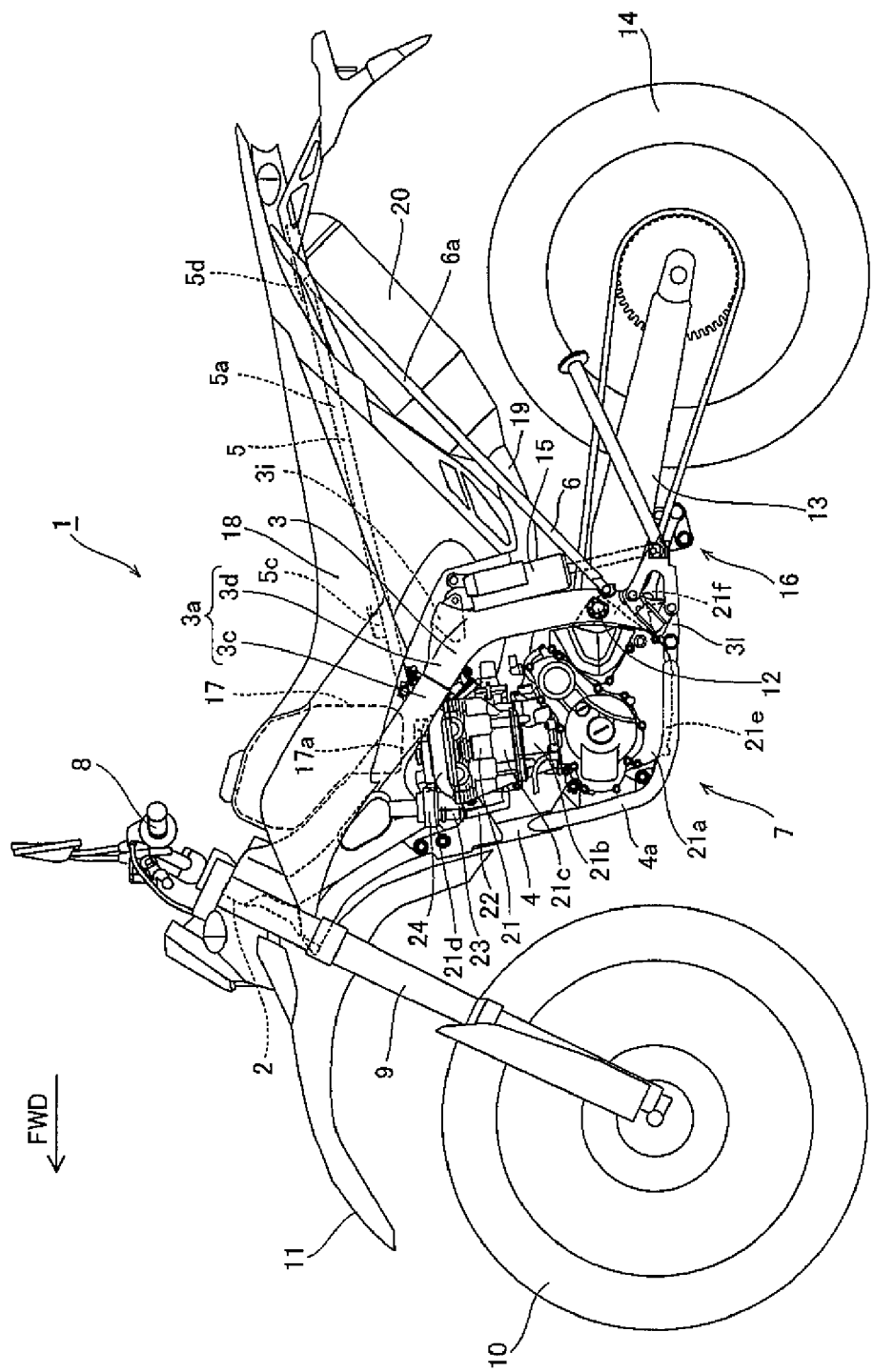
FIG. 1 is a side view of a motorcycle according to an embodiment of the invention.

FIG. 1 is a side view of a motorcycle 1 according to an embodiment of this invention. FIGS. 2-7 illustrate the structure of motorcycle 1 of FIG. 1. A motorcycle is an example of a vehicle according to the invention. In the figures, the FWD direction shown by an arrow indicates a forward traveling direction of motorcycle 1. The directions "left" and "right" in the following description are as viewed in the FWD direction.

Figure 3:
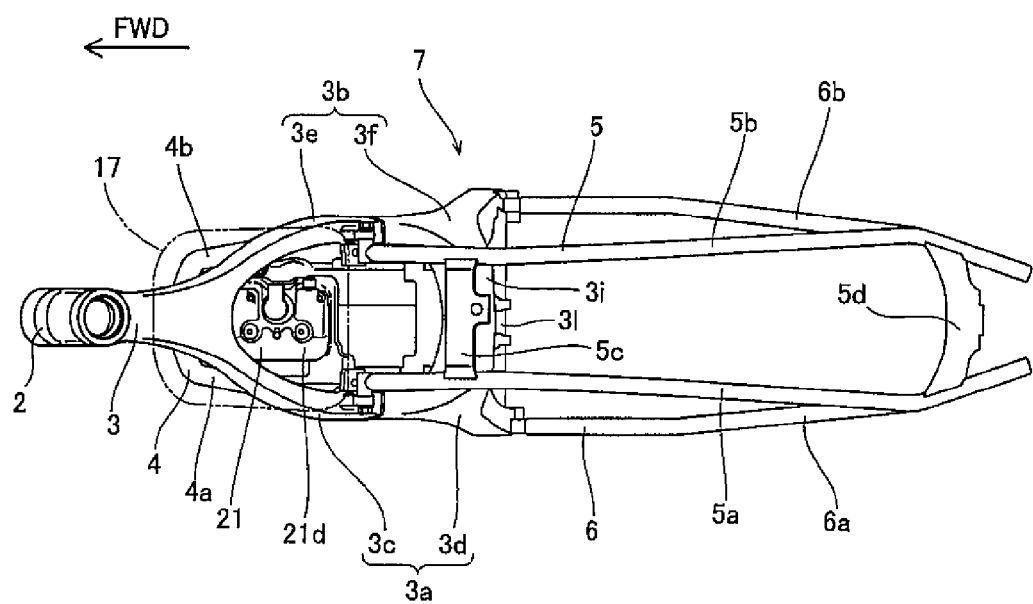
FIG. 3 is a top plan view showing the body frame and engine of the motorcycle of FIG. 1.
Figure 5:
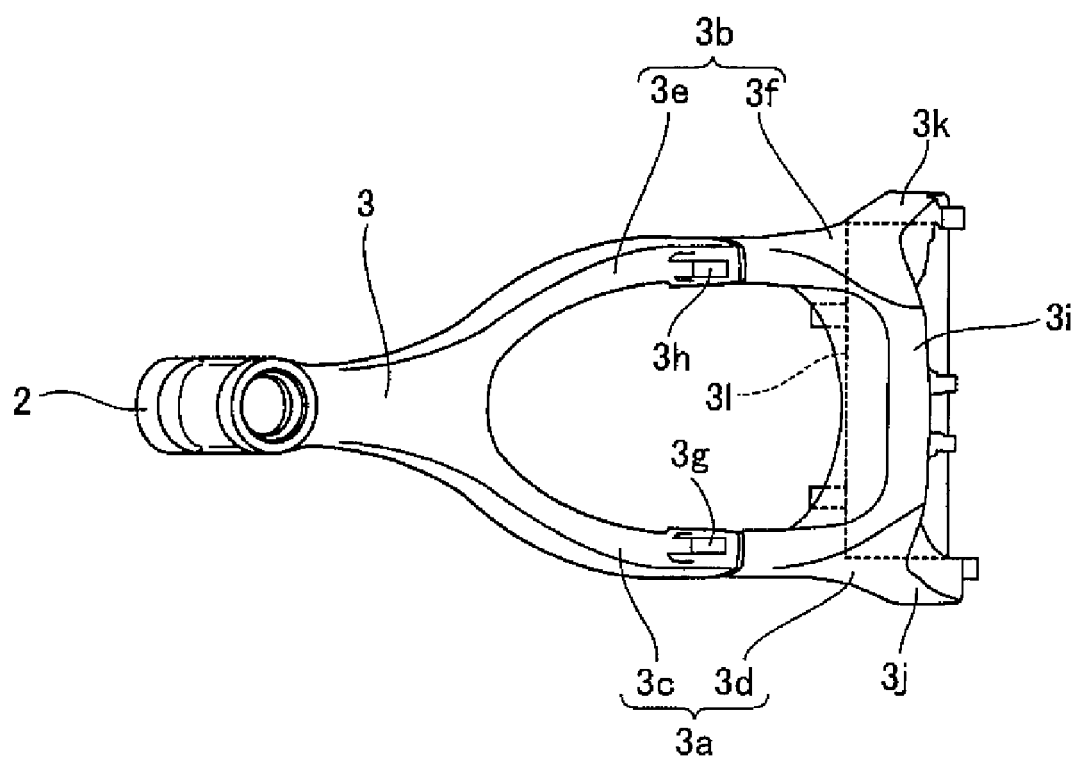
FIG. 5 is a top plan view of the main frame of the motorcycle of FIG. 1.

A body frame 7 of motorcycle 1 comprises a head pipe part 2, a main frame 3 made of aluminum, a down tube 4 made of iron, a seat rail 5 and a back stay 6. Main frame 3 extends rearward from a rear part of head pipe part 2 and passes above an engine 21. Main frame 3 includes a left side frame part 3a joined to a right side frame part 3b that extend rearward and downward (FIG. 5). A front part of down tube 4 is joined to the front part of main frame 3, and rear parts of a left side tube part 4a and a right side tube part 4b of down tube 4 (FIG. 7) are joined to rear parts of frame parts 3a and 3b. Main frame 3 is an example of a "first frame" and down tube 4 is an example of a "second frame" of the invention. Tube parts 4a and 4b are examples of a "second cylindrical part" of the invention. A left side rail 5a and a right side rail 5b of seat rail 5 (FIG. 3) extending upward to the rear are joined to frame parts 3a and 3b. Rails 5a and 5b are connected by connecting sheet metal parts 5c and 5d. Left and right side stays 6a and 6b of back stay 6 are joined to lower parts of frame parts 3a and 3b and to rails 5a and 5b (FIG. 3).

A handle 8 is disposed rotationally over head pipe part 2. A front wheel 10 is attached rotationally to lower ends of front forks 9 disposed below head pipe part 2. A front fender 11 covers front wheel 10.

A pivot shaft 12 provided in the lower part of main frame 3 rotatably supports a front end of a rear arm 13 in a vertically swingable manner. A rear mounting part 21f of engine 21 is also supported by pivot shaft 12. A rear wheel 14 is attached rotationally to the rear end of rear arm 13.

A rear suspension 15 is disposed in the rear of main frame 3 and in front of rear wheel 14. The upper part of rear suspension 15 is attached to main frame 3, while the lower part of rear suspension 15 is connected to rear arm 13 via a connecting member 16. Thus, impact caused by vertical swing (movement) of rear arm 13 and rear wheel 14 can be absorbed.

A fuel tank 17 is disposed above main frame 3 and engine 21. As shown in FIGS. 1 and 3, the lower part of fuel tank 17 is disposed in the area between left and right side frame parts 3a and 3b, and bottom face 17a of fuel tank 17 is formed into a flat surface. The front part of a seat 18 is disposed behind fuel tank 17 and above main frame 3 and engine 21. A muffler 20 joined to an exhaust pipe 19 is disposed behind main frame 3.

Figure 2:
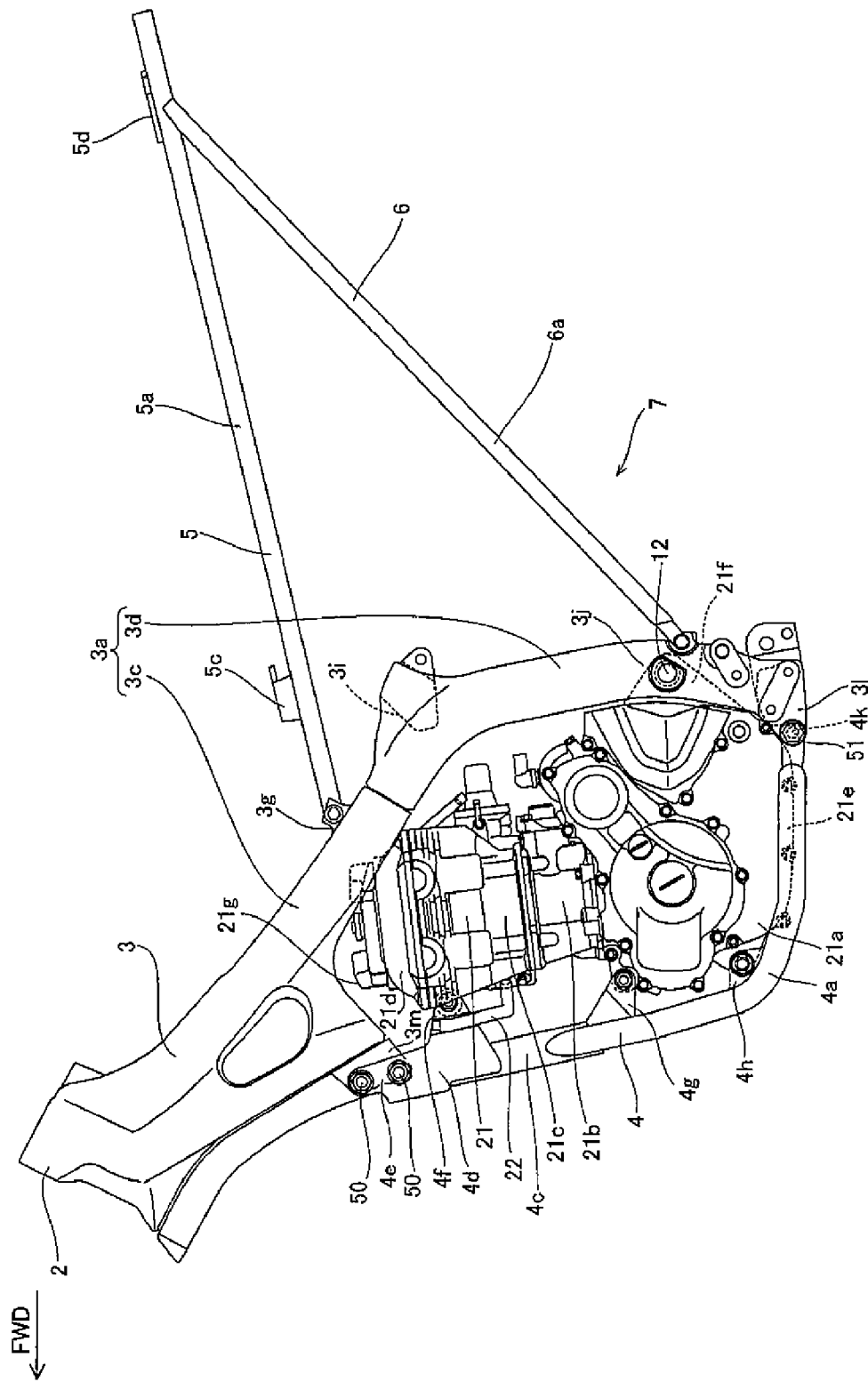
FIG. 2 is a side view of a body frame and engine of the motorcycle of FIG. 1.

Engine 21 is disposed below main frame 3 and above down tube 4, as shown in FIG. 2. Engine 21 is composed of a crankcase part 21a, a cylinder block part 21b, a cylinder head part 21c, and a cylinder head cover part 21d. An oil pan 21e and rear mounting part 21f are formed in crankcase part 21a.

In this embodiment, oil pan 21e in crankcase part 21a is disposed not to project below left and right side tube parts 4a and 4b of down tube 4 when viewed from the side, but to overlap with left and right side tube parts 4a and 4b (FIG. 2).

An air supply pipe 22 made of iron that draws in air for helping oxidation of a catalyst (not shown) in muffler 20 is fastened to the front face of cylinder head part 21c by screws. As shown in FIG. 1, a reed valve unit 24 accommodating reed valves is connected to air supply pipe 22 via a rubber connecting tube 23.

In this embodiment, as shown in FIG. 2, cylinder head cover part 21d disposed in the upper part of engine 21 is not projected above upper ends of upper frame parts 3c and 3e of main frame 3, when viewed from the side, but is disposed to overlap with upper frame parts 3c and 3e.

Figure 7:
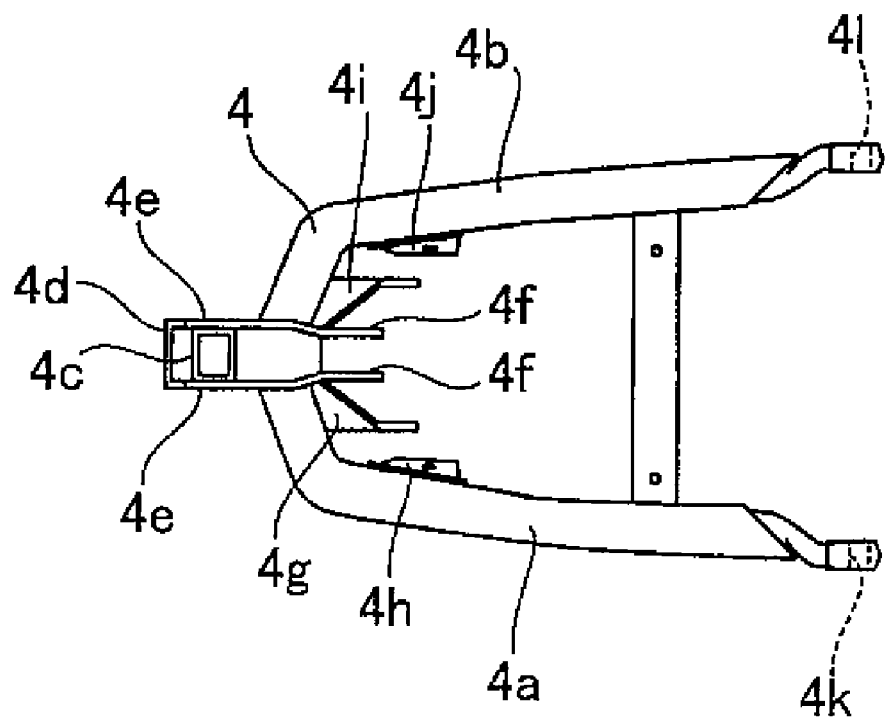
FIG. 7 is a top plan view of the down tube of the motorcycle of FIG. 1.

A relief part 21g composed of inclined planes is formed in the upper front part of cylinder head cover part 21d. Interference of cylinder head cover part 21d with main frame 3 is restricted by relief part 21g when main frame 3 rotates around connecting holes 4k and 4l of down tube 4 (FIG. 7).

The structure of body frame 7 is now described in detail.

Figure 4:
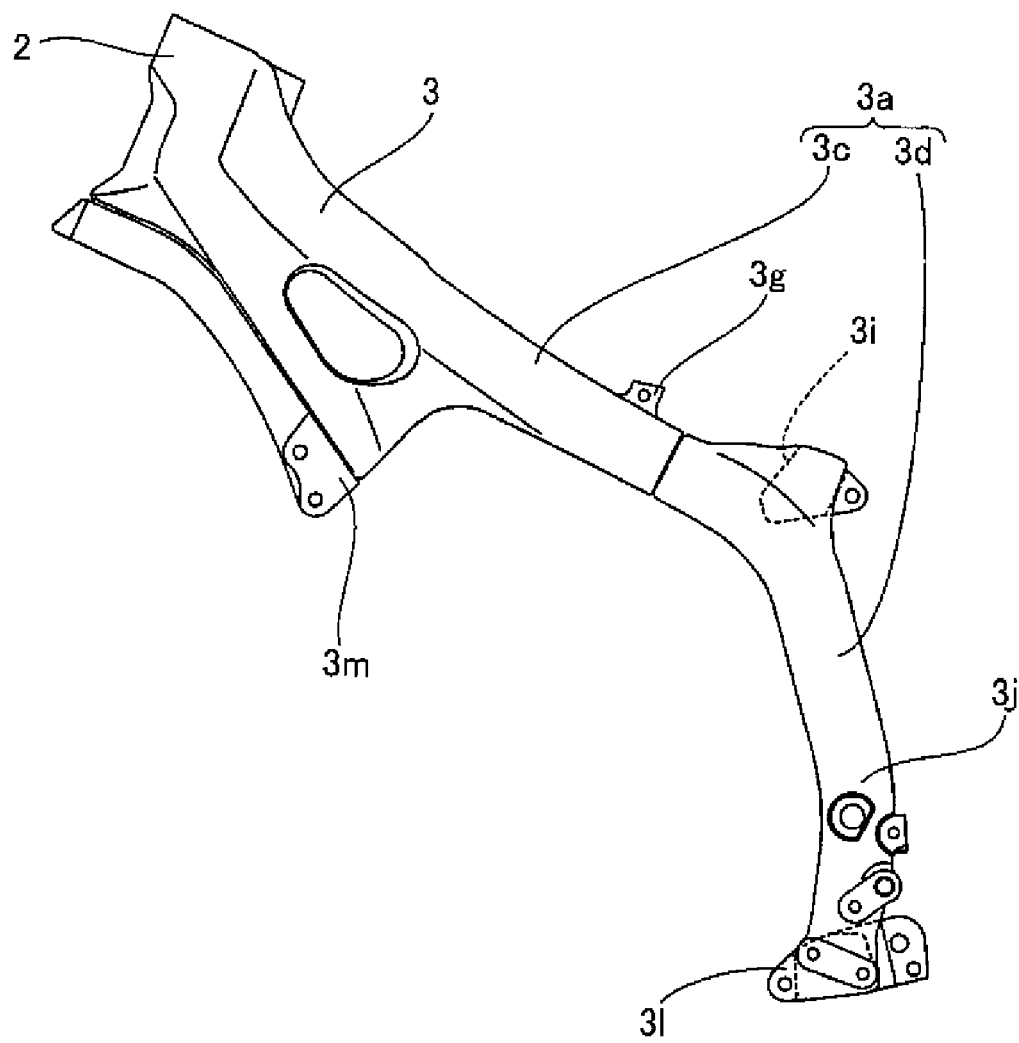
FIG. 4 is a side view of a main frame of the motorcycle of FIG. 1.

As shown in FIGS. 4 and 5, left side frame part 3a of main frame 3 comprises upper frame part 3c having a cylindrical cross-sectional shape welded to lower frame part 3d. Similarly, right side frame part 5b comprises an upper frame part 3e having a cylindrical cross-sectional shape welded to a lower frame part 3f (FIG. 5). Upper frame parts 3c and 3e are examples of a "first cylindrical part" of this invention.

Upper frame part 3c has a left side mounting part 3g for mounting left side rail 5a (FIG. 2), and upper frame part 3e has a right side mounting part 3h for mounting right side rail 5b (FIG. 5). Upper parts of lower frame parts 3d and 3f are connected by an upper-part-connecting-part 3i (FIG. 5) to which the upper part of rear suspension 15 is mounted. Pivot shaft 12 is fixed to prescribed positions of a left side fixing part 3j in the lower part of lower frame part 3d and a right side fixing part 3k in the lower part of lower frame part 3f (FIGS. 2 and 5). Left side fixing part 3j and right side fixing part 3k are an example of the "first fixing part" of this invention. The lowest ends of lower frame parts 3d and 3f are connected by a lower-part-connecting-part 3l to which tube parts 4a and 4b of down tube 4 are mounted (FIG. 2).

In this embodiment, lower-part-connecting-part 3l is composed to allow rotational motion around connecting hole 4k (FIG. 6) of left side tube part 4a and connecting hole 4l (FIG. 7) of right side tube part 4b.

Figure 6:
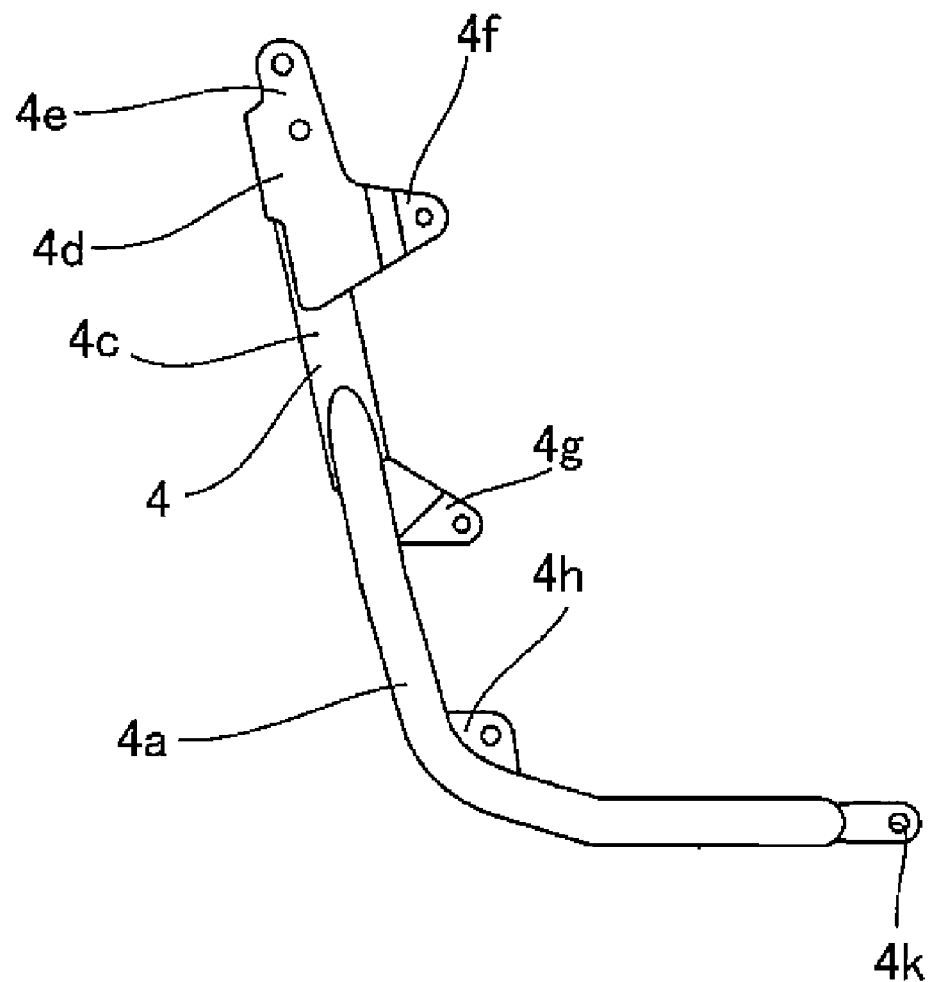
FIG. 6 is a side view of a down tube of the motorcycle of FIG. 1.

A connecting part 3m provided in the lower front part of main frame 3 (FIG. 4) is fixed to a connecting plate 4d of down tube 4 (FIG. 6).

As shown in FIGS. 6 and 7, down tube 4 includes an upper tube part 4c having a cylindrical cross-sectional shape and welded to upper front parts of tube parts 4a and 4b, and also connecting plate 4d welded to the upper part of upper tube part 4c. In the upper part of connecting plate 4d, a fixing part 4e is formed to which connecting part 3m in the front part of main frame 3 is fixed by two screw members 50 (FIG. 2). A fixing part 4f for fixing engine 21 is provided in the rear part of connecting plate 4d. As shown in FIG. 2, connecting plate 4d is disposed to be overlapped with air supply pipe 22 mounted in the front part of engine 21 when viewed from the side. As shown in FIGS. 6 and 7, tube parts 4a and 4b of down tube 4 are provided, respectively, with fixing parts 4g and 4h, and fixing parts 4i and 4j to fix engine 21. Fixing parts 4g, 4h, 4i and 4j are an example of the "second fixing part" of this invention.

Tube parts 4a and 4b of down tube 4 have a cylindrical cross-sectional shape. Connecting holes 4k and 4l are formed on rear parts of tube parts 4a and 4b (FIG. 7). Connecting holes 4k and 4l are an example of a "rear-part-connecting-part" of this invention. As shown in FIG. 2, lower-part-connecting-part 3l of main frame 3 is connected to connecting holes 4k and 4l by screw members 51.

Figure 8:
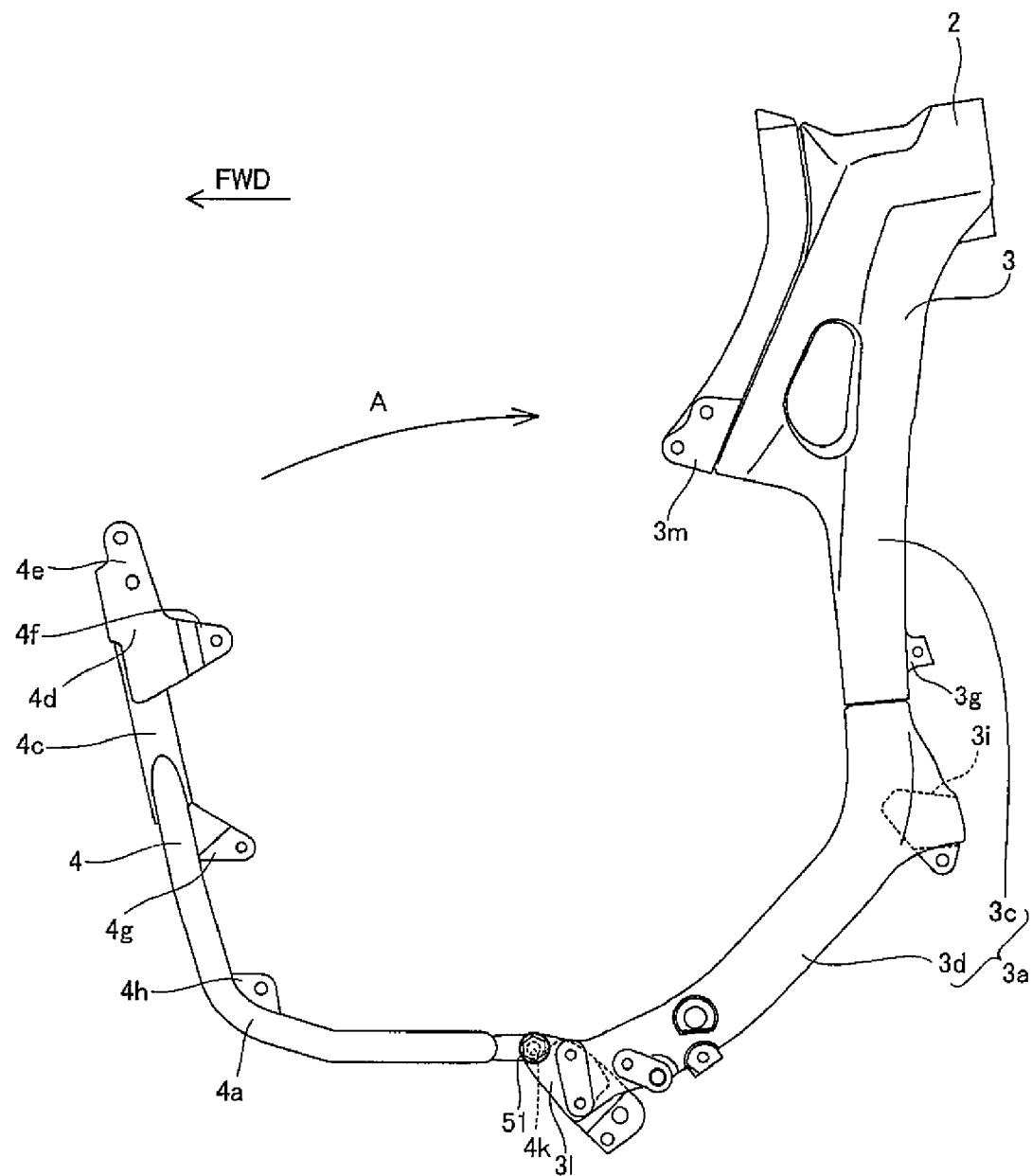
FIG. 8 is a side view illustrating an assembling process for mounting the engine to the body frame of the motorcycle of FIG. 1.
Figure 9:
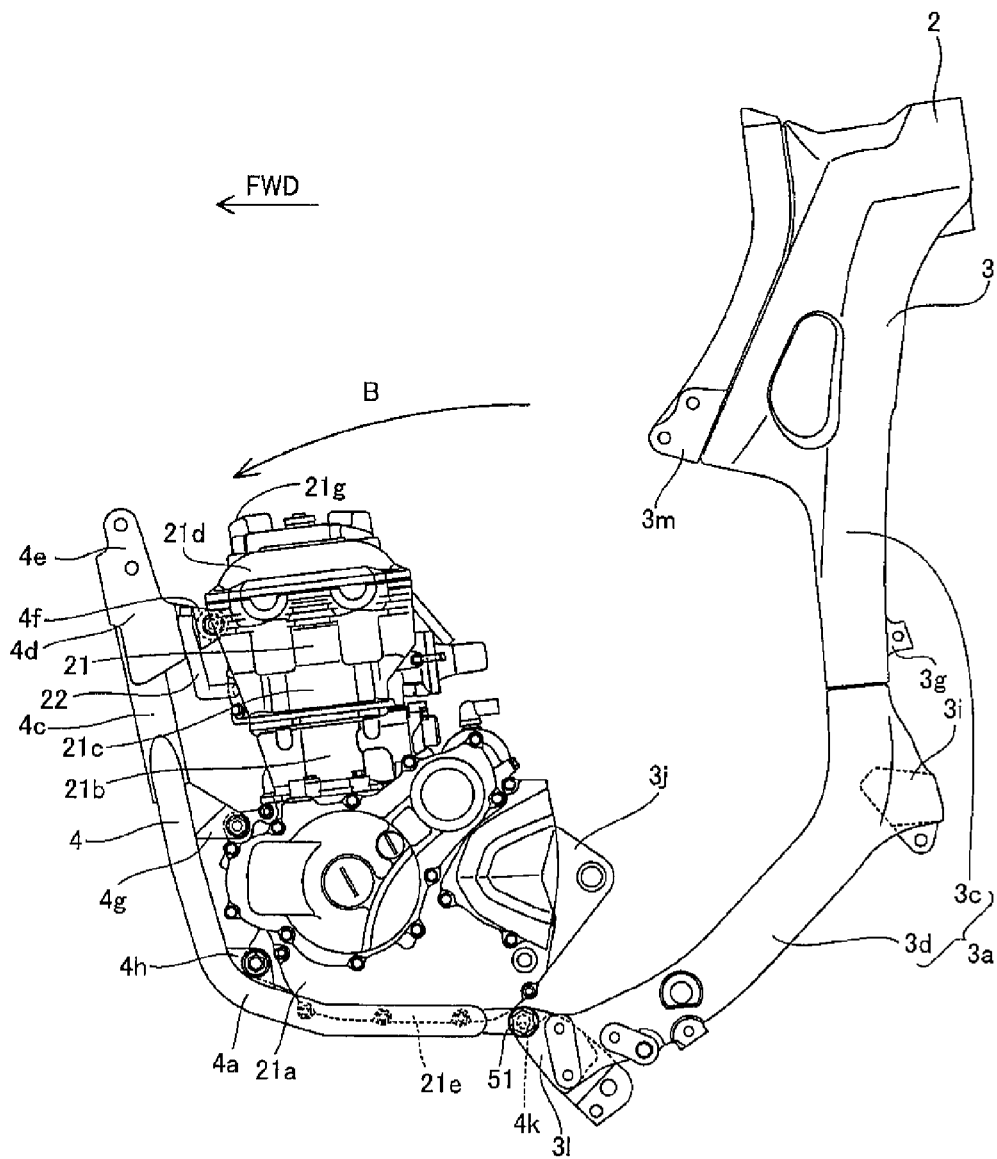
FIG. 9 is a side view illustrating the assembling process for mounting the engine to the body frame of the motorcycle of FIG. 1.

FIGS. 8 and 9 are side views illustrating the assembling process for mounting engine 21 to body frame 7.

First, as shown in FIG. 8, lower-part-connecting-part 3l of main frame 3 is connected to connecting holes 4k and 4l of tube parts 4a and 4b by screw members 51. Then, main frame 3 is rotated in the direction of arrow "A" around connecting holes 4k and 4l of down tube 4 to separate connecting part 3m of main frame 3 from connecting plate 4d of down tube 4 by a prescribed distance. In other words, main frame 3 and down tube 4 are set in an open position.

Next, engine 21 equipped with air supply pipe 22 is fixed to connecting plate 4d and fixing parts 4g, 4h, 4i (FIG. 7) and 4j (FIG. 7). Main frame 3 is then rotated in the direction of arrow "B" around connecting holes 4k and 4l to align connecting part 3m of main frame 3 with fixing part 4e of connecting plate 4d. In other words, main frame 3 and down tube 4 are set in a closed position. Then, as shown in FIG. 2, pivot shaft 12 is inserted into left and right side fixing parts 3j and 3k on main frame 3 along with rear mounting part 21f of engine 21, while connecting part 3m and fixing part 4e are fastened using screw members 50.

In this embodiment, as described above, engine 21 is disposed so that cylinder head cover part 21d is not projected above main frame 3 when viewed from the side of the vehicle, and thus, there is no need for fuel tank 17 to be formed not to abut on a part of the engine that is projecting above main frame 3. In this way, the difficulty in disposing fuel tank 17 over engine 21 and main frame 3 is reduced, and the need for main frame 3 and fuel tank 17 to take a higher position is curtailed. In addition, engine 21 is disposed such that oil pan 21e located in its lower part is overlapped with down tube 4 when viewed from the side of the vehicle. In this way, the need for down tube 4 to take a lower position is curtailed in comparison with a case in which down tube 4 is disposed below engine 21 to avoid a lower part of engine 21 from being overlapped with down tube 4. Accordingly, the possibility of interference of down tube 4 with uneven ground or the like is reduced.

Further, in this embodiment, oil pan 21e is disposed not to be projected below down tube 4, but to be overlapped with down tube 4. Thus, projection of oil pan 21e below down tube 4 is restricted and, consequently, interference of oil pan 21e with uneven ground or the like is restricted.

Also in this embodiment, connecting holes 4k and 4l to be jointed with lower-part-connecting-part 3l of main frame 3 are formed in the rear part of down tube 4, and main frame 3 is able to rotate around connecting holes 4k and 4l. Thus, engine 21 can be fixed to down tube 4 while main frame 3 and down tube 4 are set in an open position by rotating main frame 3 around connecting holes 4k and 4l in the direction of arrow "A". After engine 21 is fixed to down tube 4, main frame 3 and down tube 4 are closed by rotating main frame 3 around connecting holes 4k and 4l in the direction of arrow "B". In this way, engine 21, with its upper part being overlapped with main frame 3 and its lower part being overlapped with down tube 4, is easily disposed in a position below main frame 3 and above down tube 4.

Also in this embodiment, main frame 3 is made of aluminum and down tube 4 is made of iron. Even though main frame 3 and down tube 4 are made of different materials, they are easily fixed using screw members 50.

In addition, according to this embodiment, since fuel tank 17 is disposed above engine 21 and main frame 3, it can have a larger capacity by disposing its lower part in the area between left and right side frame parts 3a and 3b.

The embodiment disclosed herein is merely exemplary and is not limiting in nature. The scope of this invention is defined by the claims and not by the description of the embodiment set forth above, and includes meanings equivalent to the claims and modifications within the scope of claims.

For instance, the embodiment of the invention set forth above is applied to a motorcycle. However, the invention is not limited to this application and is applicable to other types of vehicles such as automobiles, bicycles, three-wheelers and ATVs (all terrain vehicles).

In addition, in this embodiment, the lower part of the engine is not projected below the down tube. However, the invention is not so limited and the lower part of the engine may be projected below the down tube.

The engine may also be disposed so that its front part is overlapped with the down tube except for the fixing part, and its rear part is overlapped with main frame except for the fixing part.

In addition, in this embodiment, the main frame rotates around connecting holes on the down tube. However, the invention is not so limited and the main frame may not rotate around connecting holes on the down tube.

Further, in this embodiment, the main frame and the down tube are made of different materials. However, the invention is not so limited and the main frame and down tube may be made of the same material.

Still further, the fuel tank is disposed above the main frame and engine in this embodiment. However, the invention is not so limited and the seat may be disposed above the main frame and engine without disposing the fuel tank there.

The invention claimed is:

1. A vehicle comprising:
   an engine;
   a first frame passing above the engine and extending rearward; and
   a second frame passing below the engine and extending rearward;
   wherein an upper part of the engine is overlapped with the first frame without projecting above the upper end of the first frame and a lower part of the engine is overlapped with the second frame when viewed from the side of the vehicle; and
   wherein a rear part of the first frame is joined to and rotatable around a rear-part-connecting-part on the second frame.

2. The vehicle according to claim 1, wherein the upper part of the engine includes a cylinder head cover part overlapped with the first frame without projecting above the first frame when viewed from the side of the vehicle.

3. The vehicle according to claim 1, wherein the lower part of the engine is overlapped with the second frame without projecting below the second frame.

4. The vehicle according to claim 3, wherein the engine includes an oil pan in a lower part of a crankcase part, and the oil pan is overlapped with the second frame without projecting below the second frame when viewed from the side of the vehicle.

5. The vehicle according to claim 1, wherein the front part of the first frame and the front part of the second frame are fastened by screw members.

6. The vehicle according to claim 5, wherein the first frame is made of aluminum and the second frame is made of iron.

7. The vehicle according to claim 1, wherein the first frame includes a first fixing part provided for fixing the engine, and the second frame includes a second fixing part provided for fixing the engine, with the engine being disposed so that its upper part is overlapped with the first frame except for the first fixing part, and its lower part is overlapped with the second frame except for the second fixing part when viewed from the sides of the vehicle.

8. The vehicle according to claim 1, wherein the first frame includes a first cylindrical part, and the second frame includes a second cylindrical part, with the engine being disposed so that its upper part is overlapped with the first cylindrical part of the first frame, and at the same time its lower part is overlapped with the second cylindrical part of the second frame when viewed from the side of the vehicle.

9. The vehicle according to claim 1, wherein a fuel tank is disposed above the engine and the first frame includes rearwardly extending left and right side frame parts, and at least part of the fuel tank is disposed in an area between the left and right side frame parts.

10. The vehicle according to claim 1, wherein a head pipe part is disposed in front of the engine, the first frame includes a main frame joined to the head pipe part, and the second frame includes a down tube joined to a front part of the main frame.

11. A motorcycle comprising the vehicle according to claim 1.

* * * * *